March 15, 1949.  R. L. COPELAND  2,464,215
ADJUSTABLE HYDRAULIC TURBINE TRANSMISSION
Filed Jan. 5, 1946
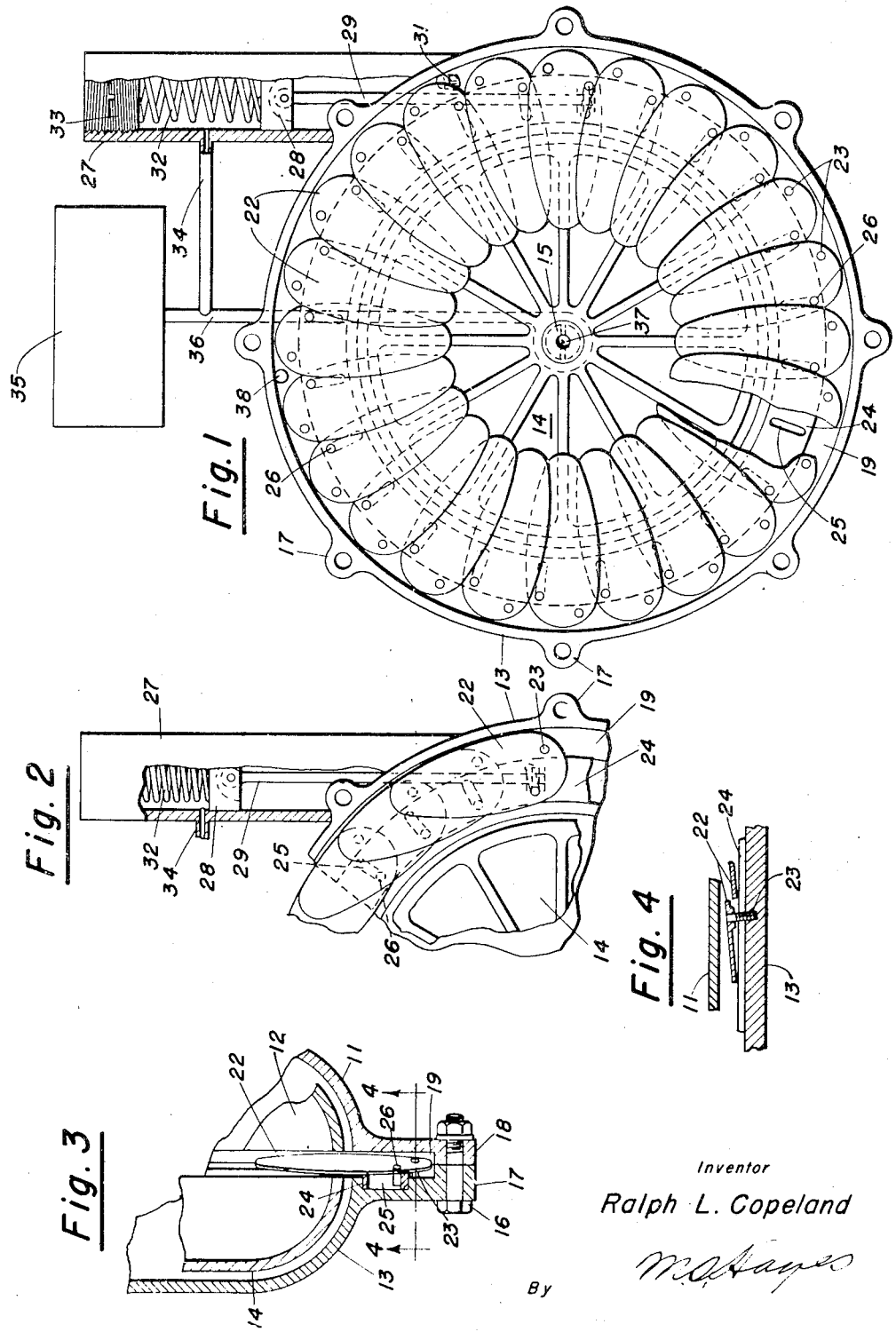
Inventor
Ralph L. Copeland
By
Attorney Patented Mar. 15, 1949

2,464,215

UNITED STATES PATENT OFFICE 2,464,215

ADJUSTABLE HYDRAULIC TURBINE TRANSMISSION

Ralph L. Copeland, Alameda County, Calif.

Application January 5, 1946, Serial No. 639,398

2 Claims. (Cl. 60—54)

(Granted under the act of March 3, 1883, as amended April 30, 1928; 370 O. G. 757)

This invention relates to fluid coupling type power transmitting devices such as hydraulic clutches or the like.

In power driven devices wherein a fluid coupling is incorporated in the drive between the power source and the driven device it is frequently desirable or necessary that the power source rotate continuously even when the driven device remains stationary. One example of such installation is an automotive vehicle. In such case the vehicle is frequently standing still with the engine running at idling speed. Under such conditions there is a drag between the impeller and runner members of the fluid coupling so that there is sufficient torque transmitted to the wheels to cause the vehicle to move unless the brakes are held applied or means such as a change speed transmission are required to disconnect the runner from the wheels. By means of my device there is substantially no torque transmitted to the runner member of the fluid coupling when the engine is merely idling or operating at a relatively low speed, and no brakes or disconnect are needed.

Broadly, my device comprises a diaphragm between the impeller and runner of a fluid coupling, there being a circular opening through the diaphragm at the axis of the coupling. The diaphragm is so constructed that the circular opening can be changed in diameter from one covering part of the cross-sectional area between the impeller and runner to one where the area is substantially unobstructed by the diaphragm. When the diaphragm is adjusted so that the opening is at its smallest diameter then the hydraulic coupling between the impeller and runner is reduced to its lowest value. When the diaphragm is fully open so that it does not offer any obstruction then maximum coupling between the impeller and runner may be obtained. Automatic means are provided to shift the diaphragm so that its opening is small when the impeller is rotating slowly and so that it is full open when it is running at full or high speed. Because of this automatic means for adjusting the size of the opening and thereby the coupling between the impeller and runner, the variable speed gearshift may be eliminated in an automotive vehicle when my coupling is used. A reverse gear will of course still be necessary. Means are provided for keeping the coupling full of fluid at all times by means of a fluid reservoir which is open to atmospheric pressure and has an axial inlet to the coupling through the impeller shaft. The housing will be maintained full in spite of temperature or atmospheric pressure changes and in spite of leaks.

It is therefore a primary object of my invention to provide a novel and improved hydraulic coupling wherein the amount of coupling between the impeller and runner is adjustable.

Another important object of my invention is to provide automatic means to vary the coupling between the impeller and runner of a fluid coupling.

Other objects will become apparent as the description proceeds in connection with the accompanying drawing, wherein:

Fig. 1 is an elevation of a transverse section through a fluid coupling illustrating an embodiment of my invention;

Fig. 2 is a partial view, similar to Fig. 1 but showing the elements forming the diaphragm shifted to the position where maximum coupling between the impeller and runner is obtained;

Fig. 3 is a partial view of a vertical longitudinal section through the bottom portion of the coupling of Fig. 1; and Fig. 4 is a partial view of a section taken substantially along the line 4—4 of Fig. 3, looking in the direction of the arrows.

In the illustrated embodiment of my invention a fluid coupling housing of the split type has a runner housing 11 (Fig. 3) for a runner 12, and an impeller housing 13 for an impeller 14 carried by a drive shaft 15 which is suitably journalled in the impeller housing 13. The impeller and runner housings are fastened together by bolts 16 passing through ears on mating peripheral flanges 17 and 18 on the two housings. The impeller 14 is of the radial vane type as shown in Figs. 1 and 2 and the runner 12 is of the same type. The impeller and runner housings are cup shaped to conform generally to the shape of the impeller and runner except at their periphery, as shown in Fig. 3.

At their periphery the impeller and runner housings are extended radially to form a circumferential channel 19 within which is disposed a circular series of shiftable shutters 22. As shown in Figs. 1 and 2 the shutters are substantially elliptical in shape. Each shutter is pivotally fastened adjacent one end to the impeller housing 13 by a stud 23 or the like which is inclined as shown in Fig. 4 so that the shutters can overlap in all positions, as indicated in Figs. 1 and 2. When in the position shown in Fig. 1 the overlapping shutters 22 are in such position that they block a large portion of the cross-sectional area between the impeller 14 and the runner 12. When, on the other hand, the shutters have been shifted to the positions shown in Fig. 2 they are substantially entirely recessed into the channel 19 and do not obstruct the passageway in the housing between the impeller and runner, so that full coupling between them is obtainable.

Within the radial extension of the impeller housing 13 and on that side forming one wall of the channel 19 is an annular recess which receives a ring 24 mounted for rotation therein by ball bearings or the like (not shown). Along its entire circumference the ring 24 is provided with a series of equally spaced substantially radial slots 25, the number of slots equalling the number of shutters 22. The slots 25 may pass entirely through the ring 24 as shown in Fig. 3.

Each shutter has fixed to it a pin 26 which extends into a slot 25, so that when the ring 24 is rotated counter-clockwise as viewed in Fig. 1 the shutters will all be simultaneously rotated in a clockwise direction towards the position in which they are shown in Fig. 2. The portions of the pins 26 which project into the slots 25 are tapered so that they do not bind in the slots due to the movement of the shutters about the inclined studs 23.

As shown in Figs. 1 and 2 a vertical cylinder 27 is affixed to the forward wall of the impeller housing. An actuating piston 28 within the cylinder 27 has a connecting rod 29 pivotally attached at its lower end to the ring 24. The cylinder 27 is in communication at its lower end with the fluid in the housing by means of a passageway 31 through the impeller housing 13 so that the pressure of the hydraulic fluid within the housing and at the periphery of the impeller and runner is applied to the underside of the piston 28. A spring 32 is adjustably compressed against the top of the piston by means of a retaining nut 33 threaded into the top of the cylinder 27. From that portion of the cylinder above the uppermost position of the piston and below the nut 33 a conduit or fluid vent 34 communicates with the bottom of a reserve fluid tank 35 suitably mounted on top of the split housing. Another conduit 36 leads from the bottom of the reserve tank 35 to an annular groove on the drive shaft 15 which in turn communicates with the interior of the housing by means of a central passage 37 which is open to the interior of the housing at the inner end of the shaft. An air vent 38 having a cap or the like for closure purposes, communicates with the interior of the impeller housing 13 at an upper portion of the channel 19 so that air can be vented from the coupling housing in order to completely fill it with fluid. Thus as long as fluid is kept in the reserve tank the entire system of housing, piston, and conduits will always remain full. The reserve tank is suitably vented to the atmosphere.

The operation of the fluid coupling is as follows: With the entire system filled with fluid and with the impeller stationary, the position of the shutters, ring, piston, etc., will be as shown in Fig. 1. Now as the impeller is rotated at low speed, or at speeds corresponding to the engine idling speed of an automotive vehicle, the fluid within the housing will rotate but the fluid pressure resulting from the centrifugal force due to its rotary movement will not be sufficient to move the piston 28 upward against the force of the spring 32. The shutters will thus remain in the position of Fig. 1 where they obstruct the flow of fluid between the impeller and runner and substantially no torque will be imparted to the runner. It will be noted that the shutters which form the diaphragm are particularly effective in interfering with the transmission of torque to the runner since they obstruct the flow of fluid between the outer or peripheral portions of the impeller and runner, and because as the size of the opening increases in diameter it does so from the center outward and the shutters uncover the peripheral portions of the impeller and runner last of all. Thus starting with an idling speed there is substantially no transmission of torque; but as the impeller speeds up so that the fluid begins to whirl at a higher speed, it builds up a higher pressure in the peripheral channel 19 of the housing to which the cylinder 27 is connected by the passageway 31. With the increasing pressure the piston 28 is forced upwards against the action of spring 32 and the ring 24 is rotated counter-clockwise. This rotates the shutters clockwise towards the position shown in Fig. 2. The position of the shutters is therefore dependent upon the pressure of the fluid due to its rotative speed within the housing. Any fluid which leaks past the piston 28 merely mingles with the fluid above the piston and can be displaced through conduit 34 as the piston moves up or down.

Since maximum coupling between the impeller and runner cannot be obtained until substantially all of the fluid in the housing is rotating at high speed it will be seen that because of the interference of the shutters with the fluid flow between impeller and runner the impeller may be speeded up to a comparatively high speed without transmitting full torque to the runner for a period of time until the force of the fluid causes the shutters to rotate and enlarge the opening. The change speed gearing in an automotive vehicle can thus be eliminated because in starting from a standstill the engine and impeller can be speeded up so that the engine can develop the power required to accelerate the vehicle, yet the drag on the engine will be reduced because of the reduced coupling effect between the impeller and runner due to the small opening formed by the shutters.

While the illustrated embodiment of the invention has been described particularly as applied to an automotive vehicle it is to be understood that it is equally applicable to the transmission of power to an airplane or boat propeller, or to other power driven machinery. Because of the fact that the housing is kept full of fluid at all times a more effective coupling between the impeller and runner is obtained.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

I claim:

1. A fluid coupling power transmitting device comprising an impeller; a runner; a housing for said impeller and runner having a peripheral radially extending inner channel lying in a plane between said impeller and said runner; a ring mounted in said channel; means for rotating said ring within said channel and in the plane thereof; a series of overlapping shutters rotatably mounted in said channel so that they may be shifted from a first position where they lie outside the periphery of said impeller and runner to a position where they extend radially inwardly between said runner and impeller; and connections between said ring and each of said shutters, said connections being operative to shift all of shutters simultaneously in response to rotative movement of said ring.

2. A fluid coupling power transmitting device comprising an impeller; a runner; a housing for said impeller and runner having a peripheral radially extending inner channel lying in a plane between said impeller and said runner; a ring mounted in said channel; a series of overlapping shutters rotatably mounted in said channel so that they may be shifted from a first position where they lie outside the periphery of said impeller and runner to a position where they extend radially inwardly between said runner and impeller; connections between said ring and each of said shutters and operative to shift all of said shutters simultaneously in response to rotative movement of said ring; means responsive to the pressure of the fluid adjacent said channel for moving said ring in a direction to shift said shutters away from said impeller and runner; and resilient means opposing the action of said pressure responsive means.

RALPH L. COPELAND.

REFERENCES CITED

The following references are of record in the file of this patent:

UNITED STATES PATENTS

| Number | Name | Date |
| --- | --- | --- |
| 1,024,982 | Föttinger | Apr. 30, 1912 |
| 2,021,526 | Stock | Nov. 19, 1935 |
| 2,245,684 | Kiep | June 17, 1941 |
| 2,367,364 | Miller | Jan. 16, 1945 |
| 2,390,133 | Snyder | Dec. 4, 1945 |